Figure 1:
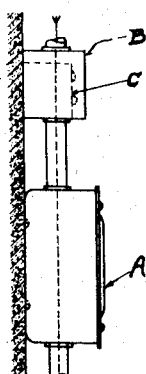

Oct. 9, 1928.

L. LARSEN 1,686,674

SUPPORT FOR ELECTRICAL APPARATUS

Filed Dec. 26, 1924     2 Sheets-Sheet 1

*Louis Larsen*
INVENTOR

BY *W. B. Whitney*
ATTORNEY

Oct. 9, 1928.

L. LARSEN 1,686,674

SUPPORT FOR ELECTRICAL APPARATUS

Filed Dec. 26, 1924    2 Sheets-Sheet 2

Louis Larsen
INVENTOR.
BY
ATTORNEYS.

Patented Oct. 9, 1928.

1,686,674

UNITED STATES PATENT OFFICE.

LOUIS LARSEN, OF EAST ORANGE, NEW JERSEY, ASSIGNOR TO SUNDH ELECTRIC COMPANY, OF NEWARK, NEW JERSEY, A CORPORATION OF NEW JERSEY.

SUPPORT FOR ELECTRICAL APPARATUS.

Application filed December 26, 1924. Serial No. 758,138.

This invention relates to electrical apparatus, and specifically to a bracket or support by means of which such apparatus for example as a motor starter or other control apparatus may be mounted adjoining a junction box and conveniently connected up to the wires therein.

In the installation of electrical motors in a building, particularly in industrial installations, it is the current practice to wire the control apparatus during the course of the interior building construction. It is therefore necessary to have the control apparatus set up in place—a matter which frequently involves delay—before doing the wiring from the mains to the motors and to the push-button or other pilot circuits; and it has been found that, unless great care is taken, the apparatus will be injured by the pulling of the wires into the enclosing casing. Moreover, the apparatus often remains for a long period without operation or care, is frequently exposed to low temperatures and to moisture, and collects dirt due to the construction work going on around—conditions which give it a bad start and are very liable to cause trouble and expense.

The object of my present invention is to provide a means for simplifying and otherwise improving the installation of electrical apparatus of this character, to thereby obviate all of the above-mentioned defects.

To this end, the invention comprises as its principal or essential feature a bracket or support upon which is mounted the motor starter or other apparatus and which is adapted to be attached to a wall or other base adjoining a junction box, so that the wires of the apparatus supported thereon may be connected directly to the wires within the junction box. In the form preferred, this support is secured in place by a flange or plate which is cut away so as to straddle the junction box, and is further provided with side walls and a hinged or removable cover which will enclose the wire connections and the front of the junction box and also with a detachable casing which encloses the apparatus itself.

It is thus possible with the use of standard junction boxes to practically complete the wiring of a building during the course of its construction without waiting for, or without setting up, the control apparatus. The junction boxes are secured conveniently in place wherever required and the wires are run from the mains into these boxes and thence to the motors and to the outside pilot circuits if any. Then, when the building is completed and ready therefor all that is necessary is to fix in place the supports with the apparatus mounted thereon, remove the fronts of the junction boxes, and make the required connections.

Two practical embodiments of my improved support are shown, by way of illustration and not of limitation, in the accompanying drawings, in which—

Figure 2:
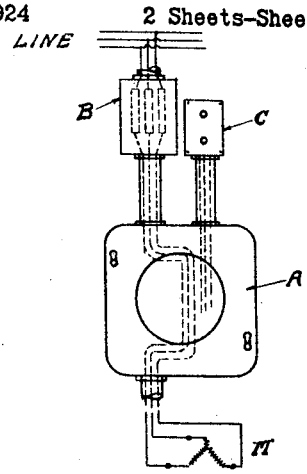
Figure 3:
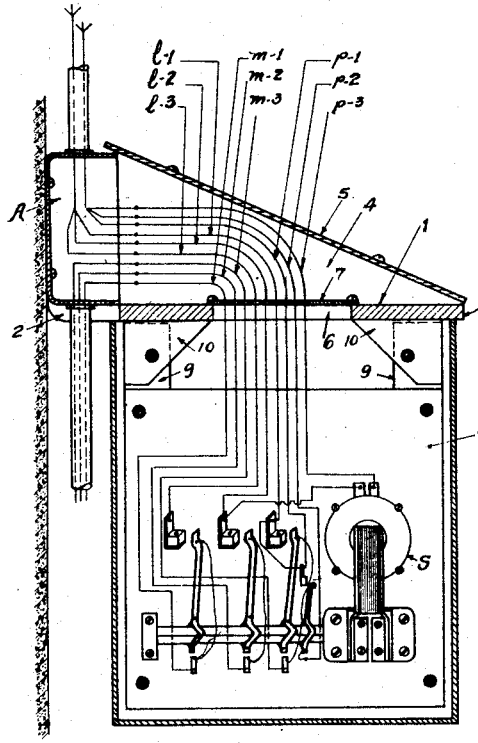
Figure 4:
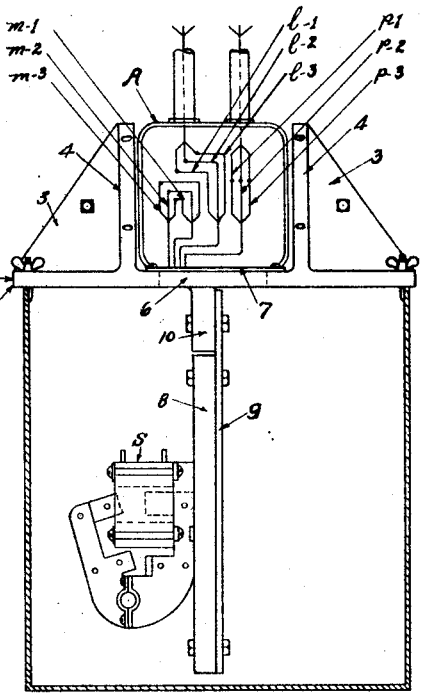
Figure 5:
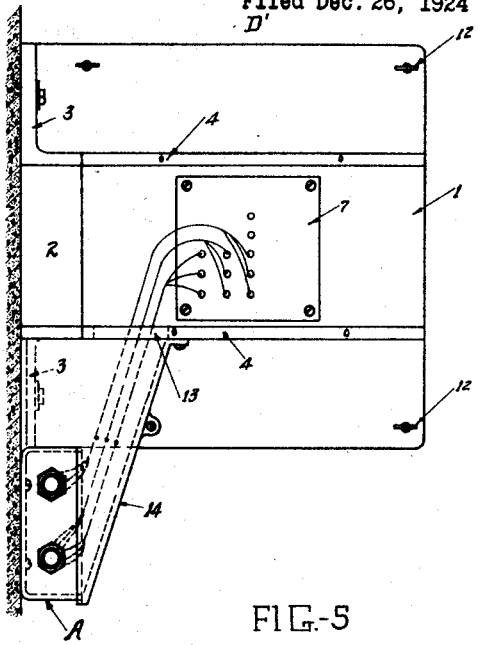
Figure 6:
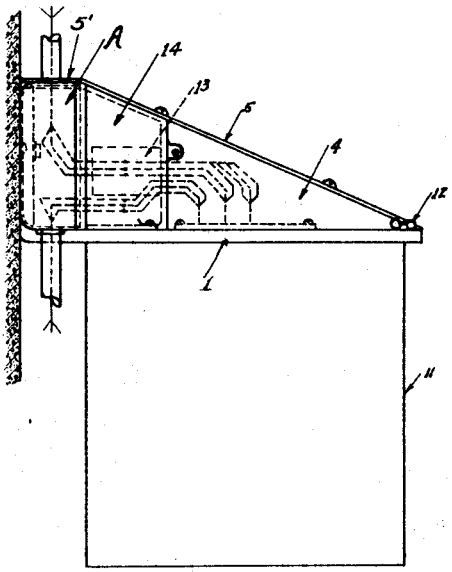

Figures 1 and 2 show, in side and in front elevation respectively and more or less diagrammatically, the preliminary wiring of a motor by means of a junction box, for instance a three-wire squirrel-cage motor with push-button control as illustrated, before the installation of the control apparatus; Figs. 3 and 4 are corresponding views of portions of the completed installation showing, partly in vertical section and partly in plan, an automatic starter for the motor secured in place by what I now regard as the preferred form of my new support, Fig. 4 showing the support with the cover or top plate removed; and Figs. 5 and 6 are top and side views, respectively, of a junction box and a support, without the top plate in Fig. 5, of slightly modified construction.

Referring first to Figs. 1 and 2 of the drawings, A indicates the standard junction box which, according to my invention, is attached to a wall or other support wherever convenient. The wires from the line, usually enclosed in a pipe, are run through a fuse box B to this junction box and thence to the motor M, a loop or loose length of the wires being preferably left within the junction box. C indicates the pilot switch, here shown as of the push-button type, which may be located as desired and from which the necessary wires of the pilot circuit are run, through a pipe, to the junction box. With these parts in place, the preliminary wiring of the installation is complete.

As illustrated in Figs. 3 and 4, the support D, for the motor controlling apparatus, comprises, in a single casting, a shelf-plate 1, which is cut away at the back, at 2, to straddle the pipe (or wires) connecting with the bottom of the junction box, the flanges or angle-plates 3 3 by which the support is attached, as by bolts, to the wall or other base to which the junction box is secured, and the triangular ribs 4 4 which are spaced apart to straddle the sides of the junction box and serve both to brace the shelf-plate and as the sides of an upper casing, closable by a cover 5 attached, as by screws, to the upper inclined edges of the ribs. The shelf-plate is further provided with an opening 6, preferably covered for convenience by a thin plate 7 pierced with holes arranged in several rows through which to pass the wires for the necessary circuit connections—for instance, wires $l^1\ l^2\ l^3$ for the line through one row of holes, the wires $m^1\ m^2\ m^3$ to the motor through a second row of holes and the wires $p^1\ p^2\ p^3$ of the pilot circuit through a third row of holes, thereby separating and identifying these wires. The control apparatus, which is indicated collectively at S, can be of any type, either automatic or manually operated. It is mounted upon a panel 8, of the usual slate or other suitable material, by straps 9 9 which are bolted to ears 10 10 integral with the lower side of the shelf-plate. There is further provided a pot or casing 11, which is detachably secured to the under side of the shelf-plate, by bolts and butterfly nuts 12 12 or otherwise, and which encloses the control apparatus. In the case of apparatus with oil-break switches, this pot may be filled with oil, while, for air-break switches, it is preferably ventilated by louvres (not shown), punched in its bottom and in one or more of the sides near the top.

To install the control apparatus the cover of the junction box is removed and may be thrown away as it is no longer needed. The support, with the control apparatus mounted thereon but without its cover or the pot, is then bolted in place, the wires are drawn out from the junction box and connected at their ends to the ends of the wires from the various switch terminals, which have been run up through the holes provided for the purpose in the shelf-plate, and the cover is screwed on and the pot is attached.

In case it should be found desirable to mount the control apparatus to one side, instead of directly in front, of the junction box, it is only necessary, as shown in Figs. 5 and 6, to form an opening 13 in one of the ribs 4 of the casting, through which to carry the wires, and, preferably, to provide the top plate 5 with an angular extension 5', which will carry it back to the wall, and a suitable casing 14 to connect and close the front of the junction box and the side opening.

When the switches are of the air-break type the shelf-plate can of course be inverted, the control apparatus being then mounted upon its upper side. Further, the control apparatus and its circuit connections with the junction box may be left exposed; but it is most desirable that they be suitably enclosed not only to prevent the accumulation of dust and dirt thereon but also to reduce to a minimum the fire hazard, especially in installations in textile and other mills where inflammable or combustible material is flying about. It is also to be understood that all of the parts may be variously modified in form and in the details of their construction.

What I claim as new, and desire to secure by Letters Patent, is—

1. A support for electrical apparatus comprising a flanged bracket upon which the electrical apparatus is to be mounted and by which it may be secured in position adjacent a standard junction box and means carried by the support and including in part the support itself adapted when the support is in position to enclose the front of the junction box and the circuit connections between the wires therein and the electrical apparatus.

2. A support for electrical apparatus comprising a bracket, upon which the apparatus is to be mounted, provided with an integral flange and two bracing ribs, the ribs being spaced apart the width of a standard junction box and the flange cut away between the ribs whereby the bracket may be attached to a wall on the opposite sides of and with the ribs straddling the junction box, and a cover plate attachable to the edges of the ribs and providing in connection with the other parts of the support when in position a box closure for the front of the junction box.

3. A support for electrical apparatus comprising a bracket, upon which the apparatus is mounted, with integral flanges and triangular bracing ribs which are spaced apart the length of a standard junction box, a pot attachable to the bracket and adapted to enclose the electrical apparatus carried thereon, and a top plate attachable to the outer edges of the triangular ribs and adapted to cover the bracket between the ribs and when the support is in place straddling a junction box to cover the front of the junction box.

4. A support of the character described comprising a bracket provided with an opening through which to pass circuit wires, electrical apparatus mounted below and carried by the bracket, a detachable pot enclosing the electrical apparatus, means for securing the bracket in position adjacent a standard junction box, and means including parts of the support and a detachable plate adapted when the support is in position to enclose the front of the junction box and the circuit connections extending through the opening in the bracket and connecting the terminals of the electrical apparatus with the wires within the junction box.

5. The combination of an electrical control device, a support and enclosure for the control device, a standard junction box, and means included in the said support and enclosure whereby it may be supported adjacent to and independent of the junction box to form also a closure for the box and for wires extending to and from the control device into the box.

LOUIS LARSEN.